Dec. 15, 1942.    W. J. THROWER    2,304,966
CAKE PLATE
Filed May 15, 1942
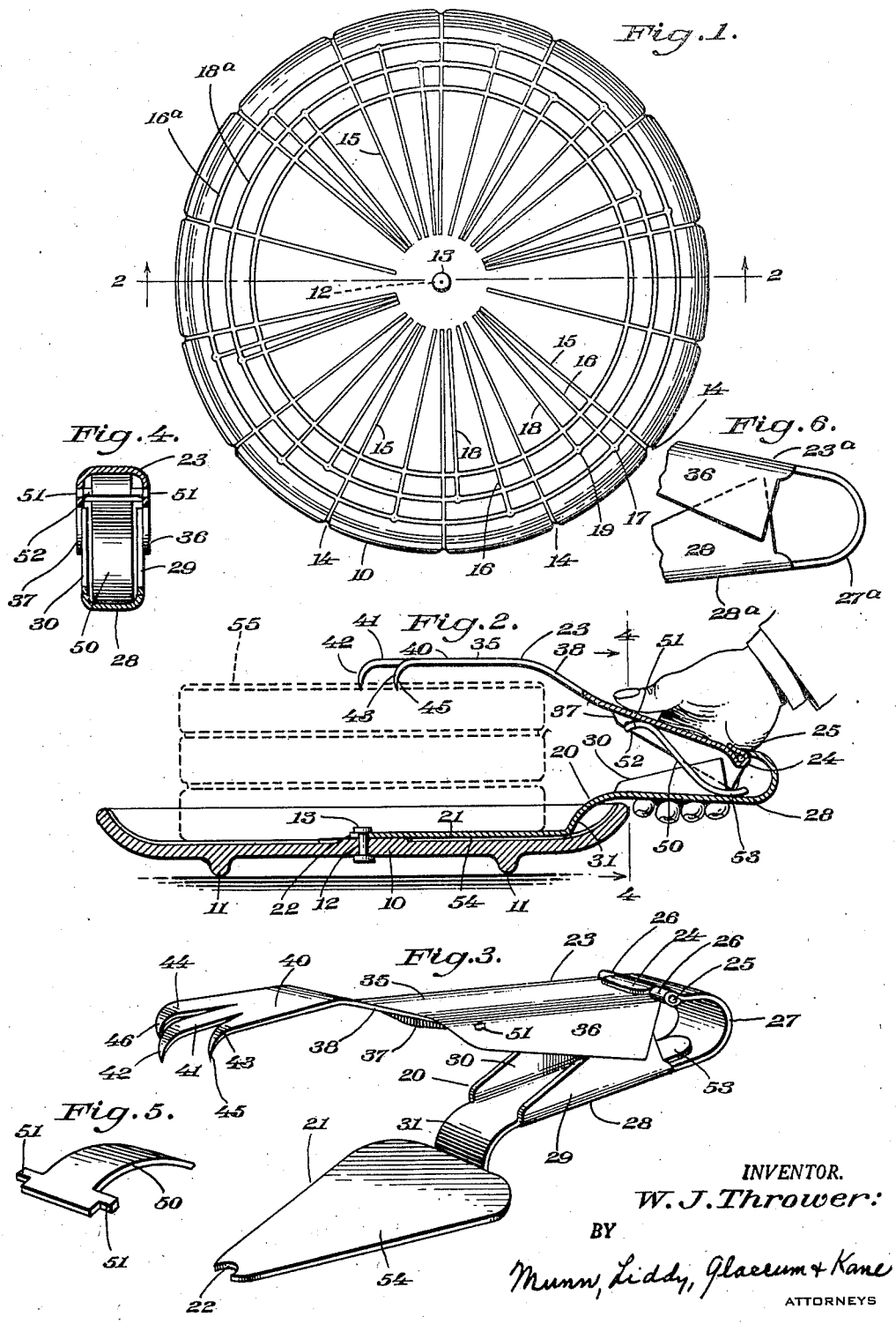
INVENTOR.
W. J. Thrower:
BY
Munn, Liddy, Glaccum & Kane
ATTORNEYS Patented Dec. 15, 1942

2,304,966

UNITED STATES PATENT OFFICE 2,304,966

CAKE PLATE

William J. Thrower, Chester, W. Va.

Application May 15, 1942, Serial No. 443,125

5 Claims. (Cl. 65—15)

This invention relates to a cake plate.

An object of the invention is the provision of a plate or platter upon which is adapted to be placed a cake and which has indications thereon for directing the cutting of the cake into various divisions with means for lifting the slices of cake from the plate after the same has been cut.

A further object of the invention is the provision of a cake plate which has a diameter normally greater than the diameter of cakes as ordinarily baked so that grooves formed in the bottom of the plate will project beyond the edges of the cake whereby the operator can neatly cut the cake into a plurality of equal slices when guided by the grooves, means being employed for lifting the slices from the plate, said means also aiding in guiding the cutting of the cake in equal proportions.

A further object of the invention is the provision of a cake plate for not only supporting a cake, but for indicating to the operator various divisions for cutting slices of a predetermined size, means removably mounted on the plate being employed for raising the slice after it has been cut and for aiding the operator in guiding a knife substantially along a radial line in accordance with the indications on the plate.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a plan view of a cake plate constructed in accordance with the principles of my invention.

Figure 2 is a vertical section taken along the line 2—2 of Figure 1.

Figure 3 is a view in perspective of a cake lifter and knife guide.

Figure 4 is a transverse vertical section of the cake lifter taken along the line 4—4 of Fig. 2.

Figure 5 is a fragmentary view in perspective of a spring for maintaining the parts of the cake lifter in an operative position.

Figure 6 is a fragmentary side view of the spring means for the legs of the lifter.

Referring more particularly to the drawing, 10 designates a plate or platter which may be formed of metal, china, porcelain or any other well known composition material. While the plate is shown as circular it may be in the form of a regular polygon. A circular base portion 11 at the underface of the plate 10 supports the plate above the table or other support.

A pin 12 is mounted at the center of the plate having a head portion 13 spaced from the upper face of the plate for a purpose which will be presently explained. This pin may be rigidly mounted at the center or may be removably mounted.

The periphery of the plate is provided with a plurality of notches 14 from which extend inwardly and radially a plurality of grooves 15. These grooves terminate adjacent the center of the plate. It will be noted that there are fourteen of these radial grooves and since these grooves act as guides for cutting the cake the cake may be cut in fourteen slices. A plurality of grooves 16 are radially formed in the plate but the outer ends of these grooves terminate in a depression 17 inwardly of the periphery of the plate. It will be noted that there are twelve of these grooves so that the cake may be cut in twelve parts by following the grooves 16. A third series of radial grooves 18 are also formed in the plate and the outer ends of these grooves terminate in depressions 19 inwardly of the depressions 17 of the grooves 16. When the cake is cut along the grooves 18 it will be found that the cake will be divided into ten parts. Other divisions may be made whereby the cake may be cut into six or eight parts as desired. Circular grooves 16a and 18a determine the outer limits of the respective radial grooves 16 and 18.

A combined cake lifter and guide is generally designated by the numeral 20. This lifter has a lower leg 21 which rests upon the upper surface of the plate 10 and has a notch 22 at the free end thereof to receive the pin 12 and be held in place by the head 13 of said pin.

An upper leg 23 which is substantially parallel to the leg 21 extends over the top of the cake and close to the upper surface for a purpose which will be presently described. The leg 23 has a curved lip 24 which receives a pin 25 carried by bearings 26 formed on the free end of a curved portion 27 extending integrally from one end of a handle portion 28 of the lower leg 21. A pair of upstanding flanges 29 and 30 are formed integrally with the handle portion 28. A curved shank 31 connects the handle portion with the flat plate 21 that engages beneath a slice of cake and supports the same when the slice is being removed.

The upper leg 23 of the cake lifter is provided with a flat portion 35 and a pair of depending flanges 36 and 37 which are in a position to neatly and frictionally engage the outer side walls of the respective flanges 29 and 30 which extend upwardly from the handle 28 of the lower leg 21 of the lifter 20.

A portion of the leg 23 as shown at 38 is bent upwardly beyond the flanges 36 and 37 at an angle to the flat portion 37 and is then bent outwardly horizontally as shown at 40. A finger 41 extends centrally and forwardly from the portion 40 and has a sharpened depending portion 42 which is in vertical alinement with the axis of the pin 12 secured in the cake plate 10. A pair of shorter fingers 43 and 44 is located at each side of the finger 41 and is also provided with depending pointed members indicated respectively by the numerals 45 and 46. While the pointed element 42 is adapted to engage over the inner end of the slices of cake, the pointed members 45 and 46 are adapted to be depressed into the top of the slice when pressure is exerted on the leg 23 as shown in Fig. 2.

The leg 23 is normally maintained in an upward and in an inoperative position by means of a spring generally designated by the numeral 50. The inner end of the spring is located between the flanges 36 and 37 of the leg 23 and has lateral projections 51 which are received in elongated passages 52 formed in the flanges 36 and 37 so that when the projections 51 which are rectangular in cross section are received by the passages 52 the inner end of the spring will be prevented from turning and will be held in place in the flanges 36 and 37. It will be noted from Fig. 2 that the spring extends downwardly and outwardly and has a curved portion 53 slidably contacting the inner face of the handle 28. Thus it will be seen that the leg 23 normally is moved outwardly so that when the lifter 54 per se which is in the shape of a flat plate or blade is inserted beneath the cake 55, the prongs 42, 45 and 46 will be above the surface of the cake.

A modified form of the connection between the legs is shown in Fig. 6 in which the handle portion 28a has a curved extension 27a and this curved extension is formed integrally with the leg 23a. The curved extension 27a is formed of spring metal so that the leg 23 will be maintained in an inoperative position until pressure is exerted thereon.

When it is desired to cut a cake, the flat plate 54 of the leg 21 is inserted beneath the cake and the outer free tapered end of the plate is moved toward the center of the cake plate 10 until the notch 22 is received by the pin 12. Furthermore, it will be noted that the plate 54 tapers from its inner end to its outer free end considerably, so that only a very reduced pointed end is located at the center of the plate. The lifter is then shifted until one edge of the plate 54 will be in substantial alinement with one of the grooves 15, 16 or 18, after which a knife may be forced through the cake until the cutting edge is located along one edge of the plate 54. The knife is then drawn outwardly to make the first cut. The lifter is then rotated, if necessary, until the opposite edge of the plate 54 alines with a cooperating radial groove 15, 16 or 18 and the second cut is made along the other edge of the triangularly shaped plate 54.

After the cut has been made the operator then presses upon the leg 23 as shown in Fig. 2 until the prong 42 has moved downwardly and has engaged the slice of cake at the apex and at the center of the plate 10. At the same time the prongs 45 and 46 will be impressed into the top of the slice whence the lifter may be withdrawn for moving the slice of cake.

The plate 54 is triangular in shape due to the fact that the slices of the cake are triangular and the plate 54 is made sufficiently small, particularly in width, so that the operator may be able to remove a slice of cake which has been made between any of the groups of radial grooves 15, 16 or 18.

The cake plate 10 may be formed of pottery, glass, wood, paper, or any other material which would be suitable for the purpose.

I claim:

1. A cake plate comprising a plate having grooves radiating from the center thereof for indicating various cuts to be made in a cake mounted on the plate, a pin at the center of said plate, a U-shaped lifter for removing cut slices of the cake and having the free end of one leg notched to receive the pin and located between the plate and cake, the other leg of the lifter being disposed above the upper surface of the cake and sufficiently close to said surface that the second-mentioned leg may be depressed onto the top of the cut slice and will cooperate with the first-mentioned leg for removing a slice of cake from the plate, and a resilient means incorporated between the legs for normally maintaining the second leg outwardly of the first leg.

2. A cake plate comprising a plate, a pin at the center of said plate, a U-shaped cake lifter having the free end of one leg notched to receive the pin and located between the plate and cake, the other leg of the lifter being disposed above the upper surface of the cake and sufficiently close to said surface that the second-mentioned leg will cooperate with the first-mentioned leg for removing a slice of cake from the plate, the free end of the second leg having fingers at the free end to penetrate the slice of cake, and a resilient means incorporated between the legs for normally maintaining the second leg in an inoperative position.

3. In a cake plate having a raised projection at the center, a cake lifter adapted for use with the plate comprising a triangularly shaped flat blade having a notch at the free end thereof to receive the raised projection, an upwardly curved shank portion extending from the other end of the blade, a handle section projecting horizontally from the shank and provided with an upwardly curved extension, a cake gripping leg pivotally connected at one end to the free end of the upwardly curved extension, prongs projecting downward from the free end of the leg, and a spring between the handle section and the leg for maintaining the leg outwardly from the blade.

4. In a cake plate having a raised projection at the center, a cake lifter adapted for use with the plate comprising a triangularly shaped flat blade having a notch at the free end thereof to receive the raised projection, an upwardly curved shank portion extending from the other end of the blade, a handle section projecting horizontally from the shank and provided with an upwardly curved extension, a cake gripping leg pivotally connected at one end to the free end of the upwardly curved extension, prongs projecting downward from the free end of the leg, and a spring between the handle section and the leg for maintaining the leg outwardly from the blade, one of the prongs being in vertical alinement with projections on the plate, the other prongs being disposed inwardly of the first-mentioned prong.

5. In a cake plate having a raised projection at the center, a cake lifter adapted for use with the plate comprising a triangularly shaped flat blade having a notch at the free end thereof to receive the raised projection, an upwardly curved shank portion extending from the other end of the blade, a handle section projecting horizontally from the shank and provided with an upwardly curved extension, the upwardly curved extension being formed of spring metal, a cake gripping leg having one end connected to the free end of the curved extension, and prongs projecting downward from the free end of the leg.

WILLIAM J. THROWER.